(12) United States Patent
Cai

(10) Patent No.: US 12,240,138 B2
(45) Date of Patent: Mar. 4, 2025

(54) HAND TOOL WITH REPLACEABLE WORKPIECE HEAD

(71) Applicant: Yepeng Cai, Guangdong (CN)

(72) Inventor: Yepeng Cai, Guangdong (CN)

( * ) Notice: Subject to any disclaimer, the term of this patent is extended or adjusted under 35 U.S.C. 154(b) by 0 days.

(21) Appl. No.: 18/833,400

(22) PCT Filed: Sep. 25, 2023

(86) PCT No.: PCT/CN2023/121048
§ 371 (c)(1),
(2) Date: Jul. 26, 2024

(87) PCT Pub. No.: WO2024/198275
PCT Pub. Date: Oct. 3, 2024

(65) Prior Publication Data
US 2024/0416537 A1    Dec. 19, 2024

(30) Foreign Application Priority Data
Mar. 31, 2023 (CN) .......................... 202320719615.4

(51) Int. Cl.
B26B 5/00 (2006.01)
A47G 21/02 (2006.01)
(Continued)

(52) U.S. Cl.
CPC ................ B26B 5/00 (2013.01); *A47G 21/02* (2013.01); *A47G 21/04* (2013.01); *A47G 21/06* (2013.01); *B26B 11/00* (2013.01)

(58) Field of Classification Search
None
See application file for complete search history.

(56) References Cited

U.S. PATENT DOCUMENTS 4,169,312 A * 10/1979 Mar .......................... B26B 5/00
30/337
2010/0080650 A1    4/2010 Gorza
(Continued)

FOREIGN PATENT DOCUMENTS

CN    202763809    3/2013
CN    203622379    6/2014
(Continued)

OTHER PUBLICATIONS

English translation of DE-102021001353-A1, Sep. 15, 2022.*
(Continued)

*Primary Examiner* — Hwei-Siu C Payer
(74) *Attorney, Agent, or Firm* — JCIPRNET

(57) ABSTRACT

A hand tool with a replaceable workpiece head includes a handle and a workpiece head. A rear end of the workpiece head is provided with an insertion block. A front end surface of the handle is provided with an insertion hole. The insertion block of the workpiece head is inserted into the insertion hole. A side wall of the handle is provided with a receiving slot which is communicated with the insertion hole. A rear end of the insertion block is provided with a locking part. The receiving slot is provided with a movable locking member and a pushing mechanism. The pushing mechanism is capable of pushing the movable locking member such that the movable locking member and the locking part are engaged with each other.

8 Claims, 7 Drawing Sheets

(51) Int. Cl.
    *A47G 21/04*     (2006.01)
    *A47G 21/06*     (2006.01)
    *B26B 11/00*     (2006.01)

(56)           References Cited

U.S. PATENT DOCUMENTS

| | | | |
|---|---|---|---|
| 2017/0266821 A1* | 9/2017 | Cheng | B25G 3/16 |
| 2021/0197411 A1* | 7/2021 | Demko | B26B 9/00 |
| 2022/0126463 A1* | 4/2022 | Horne | B26B 1/044 |
| 2022/0134583 A1* | 5/2022 | Sung | B26B 1/10 30/165 |
| 2022/0388185 A1* | 12/2022 | Dudley | B26B 1/042 |

FOREIGN PATENT DOCUMENTS

| | | |
|---|---|---|
| CN | 210989134 | 7/2020 |
| CN | 214490667 | 10/2021 |
| CN | 217454005 | 9/2022 |
| CN | 219685691 | 9/2023 |
| DE | 102012103255 | 8/2013 |
| DE | 102021001353 A1 * | 9/2022 |
| JP | 2003053701 | 2/2003 |

OTHER PUBLICATIONS

"International Search Report (Form PCT/ISA/210) of PCT/CN2023/121048", mailed on Nov. 29, 2023, pp. 1-5.

"Written Opinion of the International Searching Authority (Form PCT/ISA/237) of PCT/CN2023/121048", mailed on Nov. 29, 2023, with English translation thereof, pp. 1-11.

* cited by examiner

HAND TOOL WITH REPLACEABLE WORKPIECE HEAD

CROSS-REFERENCE TO RELATED APPLICATION

This application is a 371 of international application of PCT application serial no. PCT/CN2023/121048 filed on Sep. 25, 2023 which claims the priority benefit of China application no. 202320719615.4 filed on Mar. 31, 2023. The entirety of each of the above-mentioned patent applications is hereby incorporated by reference herein and made a part of this specification.

TECHNICAL FIELD

The present application belongs to the field of manual tool technology and specifically relates to a hand tool with a replaceable workpiece head.

DESCRIPTION OF RELATED ART

Manually-operated tools generally refer to hand tools. The so-called hand tools, compared to electric tools, are mainly tools that rely on the hand to twist or to apply force, including cutting tools, forks, spoons, etc., all of which belong to hand tools. The workpiece head of traditional hand tools is fixedly connected to the handle, which causes unavailable detachment and replacement of the workpiece head. However, the workpiece head is prone to be damaged due to long-term use, and if the workpiece head cannot be replaced, the entire handle tool needs to be scrapped, and thus the intact handle is unable to be reused, resulting in unnecessary waste. Moreover, if the workpiece head cannot be replaced, the use of hand tools will be limited (for example, the cutting tools can only be used for cutting operations and have no other functions). Therefore, in recent years, there has been a trend in the market to develop hand tools with replaceable workpiece head.

For example, a Chinese application with publication number CN217454005U, discloses a household cutting tool with a replaceable workpiece head, including a handle. A left side of the handle is provided with an installation groove, in which a cutter head is installed through a fixed mechanism. The locking plate installed on the inner wall below the installation groove by snap-fit, and a right side of the locking plate is provided with elastic pieces both at the front and rear edges. Sides facing the elastic pieces are fixedly installed with a locking block at positions near the right side. The locking blocks are all provided with slots correspond to the front and rear sides of the cutter head, and the locking block snaps into the slot. An upper surface of the locking plate corresponding to the upper side of the cutter head is provided with a movable plate, and the front and rear sides of the movable plate provided with pushing blocks at positions correspond to the elastic pieces. The handle of the above-mentioned cutting tools can be equipped with different functional styles of cutter heads, achieving multiple usage functions. The cutter head or handle can be directly replaced if damaged, which is more environmentally friendly and has lower usage costs.

However, there is shortcoming for the above-mentioned tools. The shortcoming lies in that the tool head is installed in the installation slot through a fixed mechanism. Therefore, during installation, it is necessary to first fit the locking plate and the movable plate onto the tool head, then insert the locking plate and the movable plate into the installation slot and be engaged with the installation slot by snap-fit to complete the installation of the tool head and handle. When it is necessary to detach and replace the cutter head, the locking plate and the movable plate need to be pulled out of the installation slot, and then the locking plate and the movable plate need to be separated before the cutter head can be taken out for replacement. The operation process is complex, with inconvenient detachment and assembly and slow replacement speed of the cutter head.

SUMMARY

In order to solve the above-mentioned existing problems, an object of the present application is to provide a hand tool with a replaceable workpiece head, which is convenient and fast to be assembled and disassembled.

In order to achieve the above purpose, the technical solution adopted by the present application is a hand tool with a replaceable workpiece head, which comprises a handle and a workpiece head detachably connected to a front end of the handle. A rear end of the above mentioned workpiece head is provided with an insertion block; a front end surface of the handle is provided with an insertion hole, the insertion block of the workpiece head is inserted into the insertion hole; a side wall of the handle is provided with a receiving slot; the receiving slot is communicated with the insertion hole; a rear end of the insertion block is provided with a locking part; the receiving slot is provided with a movable locking member and a pushing mechanism; the pushing mechanism is capable of pushing the movable locking member such that the movable locking member and the locking part are engaged with each other.

In the above solution, by providing an insertion block at the rear end of the workpiece head and a movable locking member that can be engaged with the locking part of the insertion block in the receiving slot, when it is necessary to install the workpiece head, the insertion block of the workpiece head can be inserted into the insertion hole of the handle, and then the pushing mechanism can be operated to push the movable locking member to be engaged with the locking part of the insertion block, thus completing the installation of the workpiece head. At this time, the locking part of the workpiece head is engaged with the movable locking member, so that the workpiece head cannot be separated from the insertion hole, thus ensuring the stability of the installation of the workpiece head. When it is necessary to detach the workpiece head, the pushing mechanism can be operated to separate the movable locking member from the locking part, so that the workpiece head can be pulled out to be separated from the insertion hole, thus completing the detachment of the workpiece head. Users can replace it with suitable workpiece heads for using according to actual usage conditions, with simple, convenient and fast replacement operation.

Furthermore, the locking part is a protruding block located at the rear end of the insertion block, and the movable locking member includes an elastic arm located in the receiving slot. A rear end of the elastic arm is fixed on an inner side of the receiving slot, a front end of the elastic arm is a free end, and the free end of the elastic arm is provided with a locking groove. The locking groove is driven by the elastic arm to be separated from the protruding block when the elastic arm is in a natural state, and the pushing mechanism is capable of pushing the elastic arm to drive the locking groove to be engaged with the protruding block. When installing the workpiece head, the insertion block of the workpiece head may be inserted into the insertion hole, and then the pushing mechanism may be operated to push the elastic arm to drive the locking groove to be engaged with the protruding block of the insertion hole, thus completing the installation of the workpiece head. When operating the pushing mechanism to release the elastic arm, at this time, the elastic arm will automatically restore by its own elastic force and drive the locking groove to be separated from the protruding block, so that the workpiece head can be pulled out.

Furthermore, the above-mentioned the pushing mechanism comprises a swing rod and a protrusion provided at an edge of a front end of the swing rod. The front end of the swing rod is connected into the receiving slot through a rotating shaft, and the swing rod can rotate around the rotating shaft to be unfolded from and folded in the receiving slot. When the swing rod is rotated to a folded state, the elastic arm is pressed by the protrusion such that the locking groove is engaged with the protruding block. When the swing rod is rotated to an unfolded state, the protrusion is misaligned with the elastic arm such that the locking groove is separated from the protruding block. When it is necessary to install a workpiece head, the insertion block of the workpiece head can be inserted into the insertion hole, and then the swing rod is rotated to the folded state, and at this time, the elastic arm is pressed by the protrusion such that the locking groove is engaged with the protrusion, thus completing the installation of the workpiece head. Due to the elastic force of the elastic arm, it will automatically restore upward, so that when the protrusion is pressing the elastic arm, the elastic arm will also push upward against the protrusion, causing the swing rod to be fixed in the folded state and not automatically unfolded, thereby ensuring the stability of the installation of the workpiece head. When it is necessary to detach the workpiece head, it is necessary to forcibly turn the swing rod to be rotated and unfolded, causing the protrusion to be misaligned with elastic arm, and at this time, the elastic arm will be automatically restored to drive the locking groove to be separated from the protruding block, allowing the workpiece head to be pulled out and completing the detachment of the workpiece head.

Furthermore, a notch is provided at an upper position of a tail end of the handle, and a protruding column is provided on a side wall of the tail end of the swing rod. When the swing rod is rotated to the folded state, the protruding column of the swing rod is placed in the notch. In this way, users can use the protruding column to turn the swing rod to be rotated and unfolded, making the operation of unfolding the swing rod more convenient.

Furthermore, the handle comprises a left handle piece and a right handle piece arranged opposite to each other. An upper spacer and a lower spacer are arranged between front ends of the left handle piece and the right handle piece. The receiving slot is formed by a gap between the left handle piece and the right handle piece, and the insertion hole is formed by an interval between the upper spacer and the lower spacer together with inner sides of the left handle piece and the right handle piece, which facilitates the detachment and installation of the handle and facilitates the installation of the elastic arm and the swing rod.

Furthermore, the rear end of the elastic arm is processed to be bent and extendedly provided with a fixed block, which will increase the elasticity of the arm. The fixed block is fixedly connected, by rivets, to the left handle piece and the right handle piece at a position between the left handle piece and the right handle piece. In this solution, the elastic arm is connected to the two handle pieces through the fixed block, which can increase the area of the connection of the elastic arm, making the connection of the elastic arm more stable and convenient.

Furthermore, the free end of the elastic arm is located above the protruding block, and a limiting block is provided on the elastic arm at a position corresponding to a rear end surface of the lower spacer. When the locking groove is engaged with the protruding block, the limiting block abuts against the rear end surface of the lower spacer. When the locking groove of the elastic arm is engaged with the protruding block, due to the elastic force of the elastic arm itself, the elastic arm will easily produce a slight forward and backward movement, which will cause a slight loosening in the workpiece head. However, through abutting the limiting block against the rear end surface of the lower spacer, it can prevent the elastic arm from moving forward and ensure that the workpiece head will not loosen during installation and will be stable during installation.

Furthermore, when the abovementioned locking groove is engaged with the protruding block, a distance between the front end of the elastic arm and a rear end of the upper spacer is 0.3 mm to 0.6 mm. In such way, the rear end of the upper spacer is able to block the forward movement of the elastic arm, preventing the locking groove of the elastic arm 3 from being forcibly pushed forward by the protruding block and becoming larger, thereby ensuring the stability of the engagement between the locking groove and the protruding block of the elastic arm.

Furthermore, the left handle piece, the right handle piece, the upper spacer and the lower spacer are all made of steel material, and the steel handle piece can improve the strength of the handle and is more durable for use. The high-strength spacer can better block the insertion block of the workpiece head and provide better stability for the installation of the workpiece head. A rear end of the handle is provided with a through hole through which a string can pass to facilitate hanging the hand tool on a wall hook for more convenient placement.

Furthermore, the workpiece head mentioned above is a cutter head, a fork head or a spoon head.

The workpiece head of the hand tool of the application can be freely replaced. Users can replace the workpiece head with a suitable workpiece head such as a cutter head, fork head, or spoon head according to the actual usage situation, and moreover with simple, convenient and fast replacement operation. When it is necessary to install a workpiece head, it only needs to insert the insertion block of the workpiece head into the insertion hole, and rotate then the swing rod to be folded, thus completing the installation of the workpiece head. The swing rod will not be automatically rotated and unfolded under the reverse push by the elastic force the elastic arm, thus ensuring the stability of the installation of the workpiece head. When it is necessary to detach the workpiece head, it simply needs to pull the protruding column to unfold the swing rod, and then pull out the workpiece head from the insertion hole to complete the detachment of the workpiece head.

DESCRIPTION OF THE EMBODIMENTS

Figure 1:
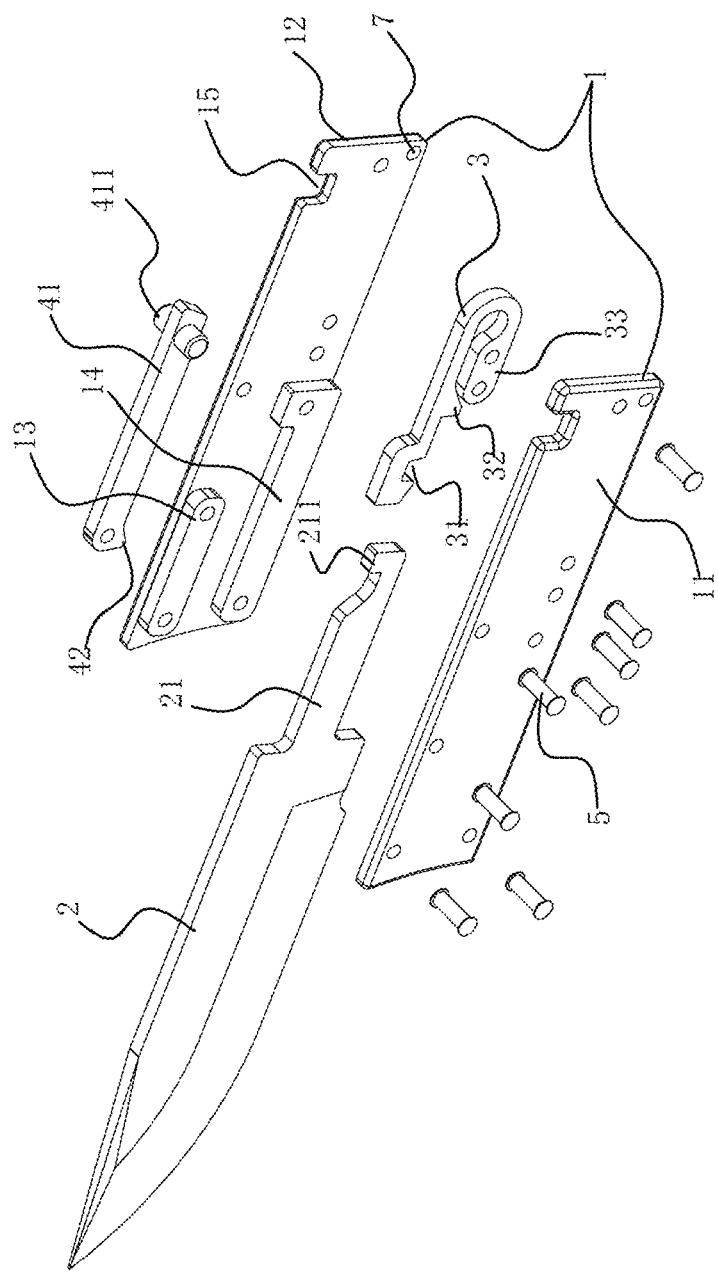
FIG. 1 is an exploded structural diagram of a hand tool with a replaceable workpiece head according to an embodiment of the present invention.

The accompanying drawings are only for exemplary illustration, and cannot be understood as limitations on the present patent. In order to better describe the present embodiments, some parts in the accompanying drawings will be omitted, enlarged or reduced, and do not represent the actual dimensions of the product; it is understandable for those skilled in the art that some well-known structures in the drawings and their descriptions may be omitted. The positional relationships described in the drawings are for exemplary illustration, and cannot be understood as limitations on the present patent.

In the accompanying drawings of the embodiments of the application, the same or similar reference numerals correspond to the same or similar components; in the description of the application, it is necessary to understand that if the terms "up", "down", "left", "right", "long", "short" and other terms indicate the orientation or positional relationship based on the orientation or positional relationship shown in the drawings, it is only for the convenience of describing the application and simplifying the description, rather than indicating or implying that the device or component referred to must have a specific orientation, be constructed and operated in a specific orientation. Therefore, the terms describing positional relationships in the accompanying drawings are only used for exemplary illustration and cannot be understood as limitations on this patent. For those of ordinary skill in the art, the specific meaning of the above terms can be understood according to specific circumstances.

The technical solution of the application is further described in detail through specific embodiments and in conjunction with the accompanying drawings

Embodiment 1

Figure 2:
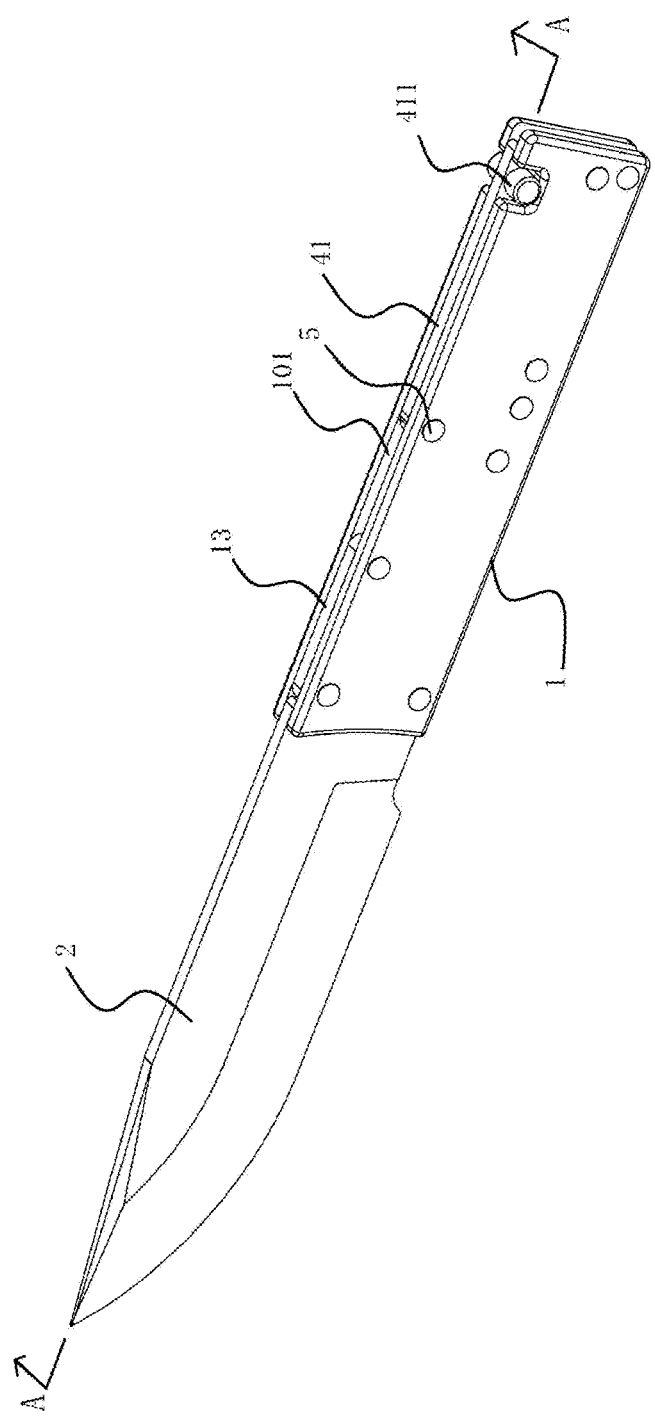
FIG. 2 is a structural diagram of the swing rod of hand tool with the replaceable workpiece head in the folded state according to the embodiment of the application.
Figure 3:
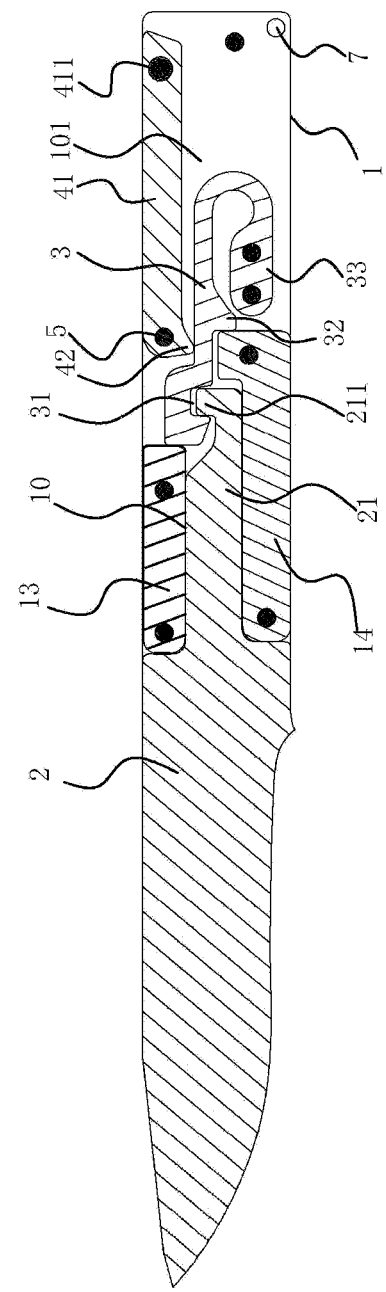
FIG. 3 is a sectional view of the A-A part in FIG. 2.

As shown in FIGS. 1, 2, and 3, the present embodiment provides a hand tool with a replaceable workpiece head, which includes a handle 1 and a workpiece head 2 detachably connected to a front end of the handle 1. A rear end of the abovementioned workpiece head 2 is provided with an insertion block 21, and a front end surface of the handle 1 is provided with an insertion hole 10. The insertion block 21 of the workpiece head 2 is inserted into the insertion hole 10, and an upper side wall of the handle is further provided with a receiving slot 101. The receiving slot 101 is communicated with the insertion hole 10. The rear end of the insertion block 21 is provided with a locking part, and the receiving slot 101 is provided with a movable locking member and a pushing mechanism. The pushing mechanism is capable of pushing the movable locking member such that the movable locking member and the locking part are engaged with each other. The abovementioned locking part is a protruding block 211 located at the rear end of the insertion block 21, and the movable locking member includes an elastic arm 3 located in the receiving slot 101. A rear end of the elastic arm 3 is fixed on an inner side of the receiving slot 101, while a front end of the elastic arm 3 is a free end and located above the protruding block 211, and a lower side wall of the free end of the elastic arm 3 is provided with a locking groove 31. The locking groove 31 is driven by the elastic arm 3 to be separated from the protruding block 211 when the elastic arm 3 is in a natural state, and the pushing mechanism is capable of pushing the elastic arm 3 to drive the locking groove 31 to be engaged with the protruding block 211.

Figure 4:
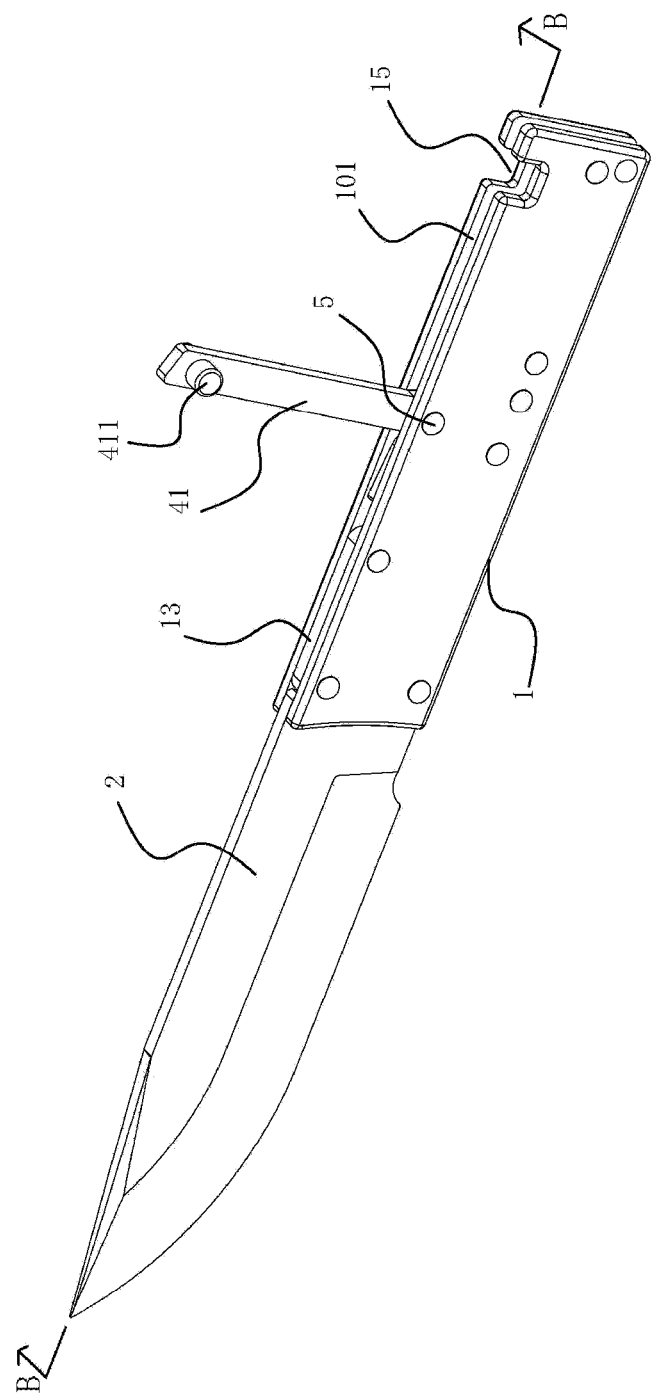
FIG. 4 is a structural diagram of the swing rod of the hand tool with the replaceable workpiece head according to the embodiment of the application.
Figure 5:
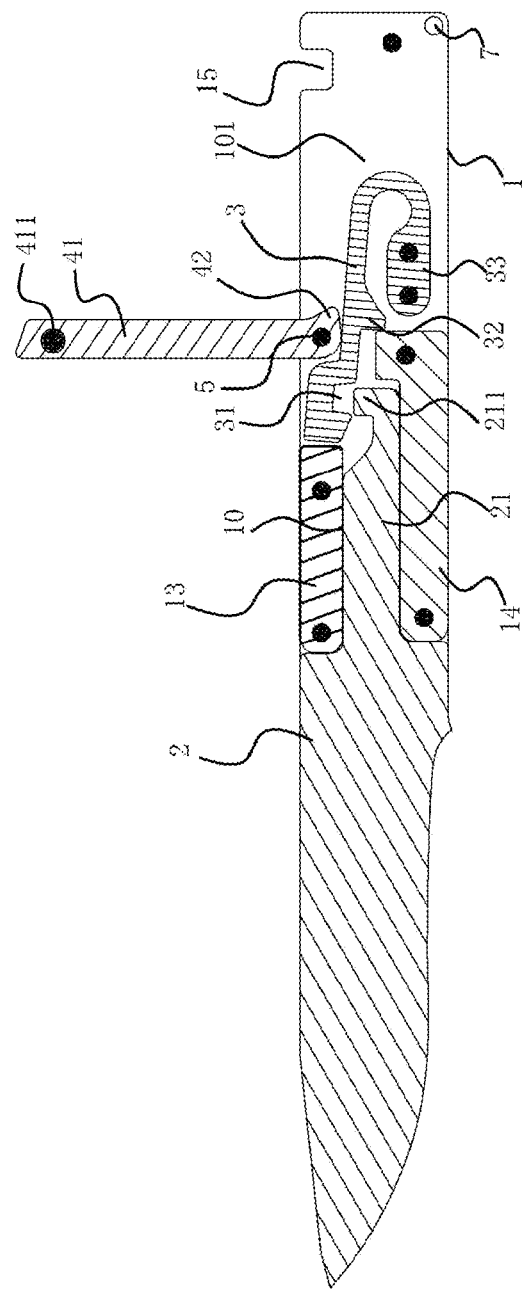
FIG. 5 is a sectional view of the B-B part in FIG. 4.

In addition, the abovementioned pushing mechanism comprises a swing rod 41 and a protrusion 42 provided at an edge of a front end of the swing rod 41. The protrusion 42 is located above the elastic arm 3. The front end of the swing rod 41 is connected into the receiving slot 101 through a rotating shaft 5, and the swing rod 41 is capable of rotating around the rotating shaft 5 to be unfolded from and folded in the receiving slot 101. As shown in FIG. 2 and FIG. 3, when the insertion block 21 of the workpiece head 2 is inserted into the insertion hole 10 of the handle 1 and the swing rod 41 is rotated to a folded state, the protrusion 42 will press the elastic arm 3 downward and cause it to be deformed, such that the locking groove 31 is engaged with the protrusion 211 of the insertion block 21. In such way, the workpiece head 2 is locked, the insertion block 21 of the workpiece head 2 is prevented from separating from the insertion hole 10. Since the elastic arm 3 will automatically be restored upward under its own elastic force, the protrusion 42 will press the elastic arm 3 while simultaneously pushing up against the protrusion 42, causing the swing rod 41 to remain fixed in a folded state without being automatically unfolded, ensuring the stability of the installation of the workpiece head 2. As shown in FIG. 4 and FIG. 5, when it is necessary to detach the workpiece head 2, it is necessary to forcibly pull the swing rod 41 so as to rotate and unfold the swing rod 41. When the swing rod 41 is rotated to an unfolded state, the protrusion 42 will be misaligned with the elastic arm 3. At this time, the elastic arm 3 will be automatically restored to drive the locking groove 31 to be separated from the protruding block, such that the workpiece head is unlock, and the workpiece head may be pulled out of insertion hole 10.

When using the hand tool of the present embodiment, as shown in FIG. 3, when it is necessary to install the workpiece head 2, the insertion block 21 of the workpiece head 2 may be inserted into insertion hole 10 of the handle 1, and then the swing rod 41 is rotated to the folded state to complete the installation of the workpiece head 2. At this time, the locking groove 31 of the elastic arm 3 is engaged with the protruding block 211 of the insertion block 21 to ensure the stability of the installation of the workpiece head 2. As shown in FIG. 5, when it is necessary to detach the workpiece head 2, it simply needs to rotate the swing rod 41 to the unfolded state, and the locking groove 31 of the elastic arm 3 will automatically be separated from the protruding block 211, such that the workpiece head 2 may be pulled out, thereby completing the detachment operation of the workpiece head 2. The replacement operation of the workpiece head 2 is simple and convenient, with fast replacement speed and better structural stability.

Figure 6:
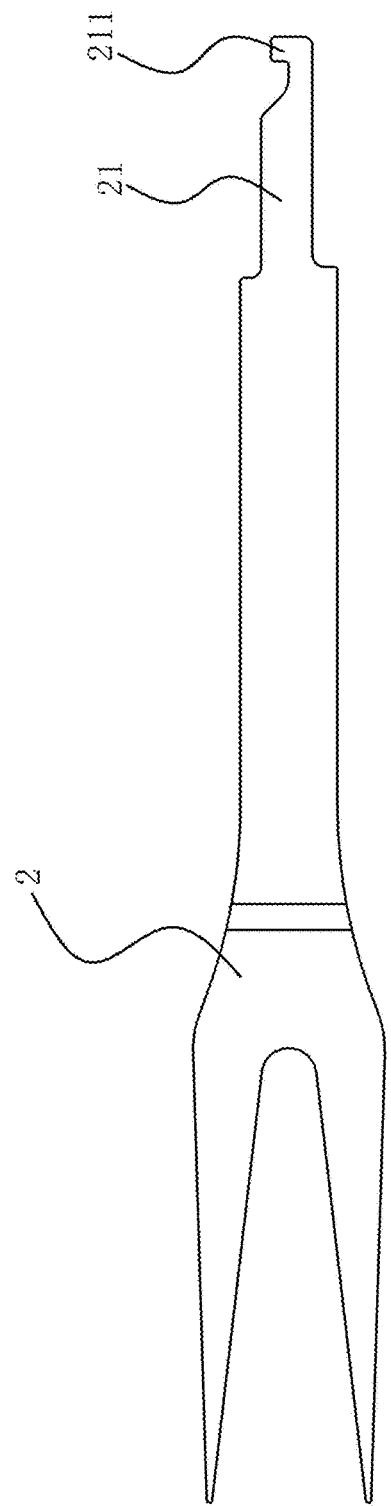
FIG. 6 is a structural diagram of the hand tool with the replaceable workpiece head being a fork head in the embodiment of the application.
Figure 7:
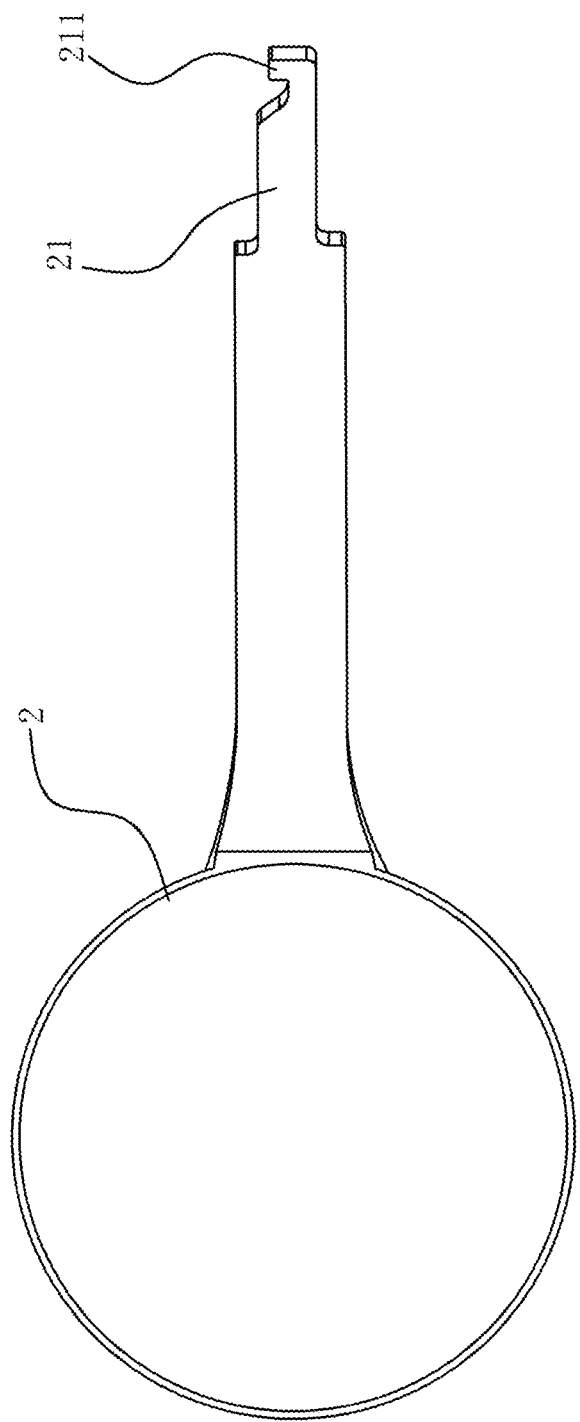
FIG. 7 is a structural diagram of the hand tool with the replaceable workpiece head being spoon head in the embodiment of the application.

As shown in FIGS. 2, 6, and 7, the workpiece head 2 of the hand tool in the present application can be a cutter head, a fork head, or a spoon head. When the workpiece head 2 is replaced with a cutter head, it can be used for cutting operations; when the workpiece head 2 is replaced with a fork head, it can be used for picking up items; when the workpiece head 2 is replaced with a spoon head, it can be used for serving soup; users can replace the appropriate workpiece head for use according to the actual usage situation.

Embodiment 2

This embodiment is a further improvement based on the structure of the hand tool with the replaceable workpiece head in embodiment 1. The improvement lies in that, as shown in FIG. 1, the handle 1 includes left handle piece 11 and a right handle piece 12 arranged opposite to each other, and an upper spacer 13 and a lower spacer 14 are arranged between the front ends of the left handle piece 11 and the right handle piece 12. The receiving slot 101 is formed by a gap between the left handle piece 11 and the right handle piece 12, and the insertion hole 10 is formed by an interval between the upper spacer 13 and the lower spacer 14 together with inner sides of the left handle piece 11 and the right handle piece 12. As shown in FIG. 3 and FIG. 5, the front end surface of the upper spacer 13 is flush with the front end surface of the lower spacer 14. When the insertion block 21 of the workpiece head 2 is inserted into the insertion hole 10, the rear end surface of the workpiece head 2 abuts against the front end surfaces of the upper spacer 13 and of the lower spacer 14, and at the same time, the protruding block 211 of the insertion block 21 is located at the opening of the locking groove 31, which facilitates alignment of the opening of the locking groove 31 with the protruding block 211, so that the locking groove 31 can be accurately engaged with the protruding block 211.

In addition, the rear end of the abovementioned elastic arm 3 is processed to be bent and extendedly provided with a fixed block 33, which may enhance the elastic force of the elastic arm 3. The abovementioned fixed block 33 is fixedly connected, by rivets, to the left handle piece 11 and the right handle piece 12 at a position between the left handle piece 11 and the right handle piece, which can increase the area of the connection of the elastic arm 3, making the connection of the elastic arm 3 more stable and convenient. The above mentioned swing rod 41 is located between the left handle piece 11 and the right handle piece 12, and the two ends of the rotating shaft 5 located at the front end of the swing rod 41 are fixedly connected to the inner sides of the left handle piece 11 and of the right handle piece 12, respectively, such that the swing rod 41 may be rotated around the rotating shaft 5 to be unfolded and folded between the left handle piece 11 and the right handle piece 12.

In the present embodiment, the hand tool is designed by dividing the handle 1 into the left handle piece 11 and the right handle piece 12, which facilitates the detachment and installation of the handle 1, and also facilitates the installation of the elastic arm 3 and the swing rod 41.

Embodiment 3

This embodiment is a further improvement based on the structure of the replaceable workpiece head hand tool in embodiment 2. The improvement lies in that, as shown in FIG. 2 and FIG. 4, notches 15 are respectively provided at upper positions on the rear ends of the left handle piece 11 and the right handle piece 12, and the positions of the two notches 15 are aligned. The left and right side walls of the rear end of the swing rod 41 are respectively provided with a protruding column 411. When rotating the swing rod 41 to the folded state, the two protruding columns 411 are respectively placed in the notches 15 on the corresponding side, such that users can use the protruding columns 411 to turn the swing rod 41 to be rotated and unfolded, making the opening operation of the swing rod 41 more convenient.

As shown in FIG. 3, a limiting block 32 is provided on the above-mentioned elastic arm 3 at a position corresponding to a rear end surface of the lower spacer 14. When the locking groove 31 is engaged with the protruding block 211, the limiting block 32 abuts against the rear end surface of the lower spacer 14. When the locking groove 31 is engaged with the protruding block 211, the stop block 32 interferes with the rear end surface of the lower spacer 14. When the locking groove 31 of the elastic arm 3 is engaged with the protruding block 211, due to the elastic force of the elastic arm 3 itself, the elastic arm 3 will easily produce a slight forward and backward movement, which will cause a slight loosening in the workpiece head 2. However, by limiting the forward movement of the elastic arm 3 through abutting the limiting block 32 against the rear end surface of the lower spacer 14, it can prevent the elastic arm 3 from moving forward and ensure that the workpiece head 2 will not loosen during installation and will be stable during installation, and thus makes it easier to operate hand tools.

In addition, in order to further improve the stability of the engagement between the locking groove 31 of the elastic arm 3 and the protruding block 211, when the abovementioned locking groove 31 is engaged with protruding block 211, the distance between the front end of the elastic arm 3 and the rear end of the upper spacer 13 is 0.3 mm-0.6 mm. In such way, the rear end of the upper spacer 13 may block the forward movement of the front end of the elastic arm 3, avoiding the locking groove 31 of the elastic arm 3 from being forcibly pushed forward by the protruding block 211 and becoming larger, thus ensuring the stability of the engagement between the locking groove 31 and the protruding block 211. The distance of 0.36 mm-0.6 mm may ensure that the upper spacer 13 will not affect the upward restoration of the elastic arm 3, wherein the distance between the front end of the elastic arm 3 and the rear end of the upper spacer 13 is preferably 0.5 mm.

As shown in FIG. 1 and FIG. 2, the rear ends of the left handle piece 11 and the right handle piece 12 are provided with oppositely arranged through holes 7. When in use, a string can be threaded through the through holes 7 to facilitate hanging the hand tool on the wall hook, making it easier to be placed. In addition, the left handle piece 11, the right handle piece 12, the upper spacer 13, and the lower spacer 14 are all made of steel material. The handle pieces made of steel material can improve the strength of the handle and is more durable for use. The high-strength spacers can better block the insertion block 21 of the workpiece head 2, which is better for the installation stability of the workpiece head 2. Since the workpiece head 2 of the hand tool in the present embodiment is a freely replaceable structure, it can be directly replaced when the workpiece head 2 is damaged, while the handle 1 made of steel material can be reused without wasting the handle 1, which is beneficial to environmental protection.

Obviously, the above embodiments of the present application are only examples for clearly explaining the present application, and are not limitations on the implementation of the present application. For those skilled in the art, other changes or modifications can be made based on the above description. It is not necessary or possible to exhaust all the implementation. Any modifications, equivalent substitutions, and improvements made within the spirit and principles of the present application should be included within the scope of protection of the claims of the present application.

What is claimed is:

1. A hand tool with a replaceable workpiece head, comprising a handle and the workpiece head detachably connected to a front end of the handle, wherein a rear end of the workpiece head is provided with an insertion block, a front end surface of the handle is provided with an insertion hole, the insertion block of the workpiece head is inserted into the insertion hole, a side wall of the handle is provided with a receiving slot, the receiving slot is communicated with the insertion hole, a rear end of the insertion block is provided with a locking part, and the receiving slot is provided with a movable locking member and a pushing mechanism, and the pushing mechanism is capable of pushing the movable locking member such that the movable locking member and the locking part are engaged with each other, the locking part is a protruding block located at the rear end of the insertion block, and the movable locking member includes an elastic arm located in the receiving slot, a rear end of the elastic arm is fixed on an inner side of the receiving slot, a front end of the elastic arm is a free end, the free end of the elastic arm is provided with a locking groove, the locking groove is driven by the elastic arm to be separated from the protruding block when the elastic arm is in a natural state, and the pushing mechanism is capable of pushing the elastic arm to drive the locking groove to be engaged with the protruding block, the pushing mechanism comprises a swing rod and a protrusion provided at an edge of a front end of the swing rod, the front end of the swing rod is connected into the receiving slot through a rotating shaft, the swing rod is capable of rotating around the rotating shaft to be unfolded from and folded in the receiving slot; when the swing rod is rotated to a folded state, the elastic arm is pressed by the protrusion such that the locking groove is engaged with the protruding block; when the swing rod is rotated to an unfolded state, the protrusion is misaligned with the elastic arm such that the locking groove is separated from the protruding block.

2. The hand tool with the replaceable workpiece head according to claim 1, wherein a notch is provided at an upper position of a tail end of the handle, and a protruding column is provided on a side wall of a tail end of the swing rod, when the swing rod is rotated to the folded state, the protruding column of the swing rod is placed in the notch.

3. The hand tool with the replaceable workpiece head according to claim 2, wherein the handle comprises a left handle piece and a right handle piece arranged opposite to each other, an upper spacer and a lower spacer are arranged between front ends of the left handle piece and the right handle piece, the receiving slot is formed by a gap between the left handle piece and the right handle piece, and the insertion hole is formed by an interval between the upper spacer and the lower spacer together with inner sides of the left handle piece and the right handle piece.

4. The hand tool with the replaceable workpiece head according to claim 3, wherein the rear end of the elastic arm is processed to be bent and extendedly provided with a fixed block, and the fixed block is fixedly connected, by rivets, to the left handle piece and the right handle piece at a position between the left handle piece and the right handle piece.

5. The hand tool with the replaceable workpiece head according to claim 3, wherein the free end of the elastic arm is located above the protruding block, and a limiting block is provided on the elastic arm at a position corresponding to a rear end surface of the lower spacer, when the locking groove is engaged with the protruding block, the limiting block abuts against the rear end surface of the lower spacer.

6. The hand tool with the replaceable workpiece head according to claim 5, wherein when the locking groove is engaged with the protruding block, a distance between the front end of the elastic arm and a rear end of the upper spacer is 0.3 mm to 0.6 mm.

7. The hand tool with the replaceable workpiece head according to claim 3, wherein the left handle piece, the right handle piece, the upper spacer and the lower spacer are all made of steel material, and a rear end of the handle is provided with a through hole.

8. The hand tool with the replaceable workpiece head according to claim 1, wherein the workpiece head is a cutter head, a fork head or a spoon head.

* * * * *